US006526409B1

United States Patent
Olsen et al.

(10) Patent No.: US 6,526,409 B1
(45) Date of Patent: Feb. 25, 2003

(54) DATA ELEMENT CHARACTERISTICS

(75) Inventors: Theresa M. Olsen, Coral Springs, FL (US); Eric Perry, Boynton Beach, FL (US)

(73) Assignee: Daleen Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/477,458

(22) Filed: Jan. 4, 2000

(51) Int. Cl.[7] .......................... G06F 17/00; G06F 17/60
(52) U.S. Cl. ......................................... 707/102; 705/40
(58) Field of Search ............................... 707/1–2, 6–10, 707/100–102, 103–104.1, 200, 201–205, 500–502, 513–516; 709/200–205, 217–230, 2; 705/34, 40

(56) References Cited

U.S. PATENT DOCUMENTS 5,721,827 A * 2/1998 Logan et al. ............... 709/217
5,813,007 A * 9/1998 Nielsen .......................... 707/1

* cited by examiner

*Primary Examiner*—Alford W. Kindred
(74) *Attorney, Agent, or Firm*—Jon A. Gibbons; Fleit, Kain, Gibbons, Gutman & Bongini P.L.

(57) ABSTRACT

A method for provisioning at least one subscriber characteristic in a billing system includes the steps of creating at least one subscriber characteristic record. The method continues by creating a one subscriber record with entries for subscriber identification and inserting in a subscriber characteristic record, a first key for associating with the subscriber record. A characteristic record is created with entries for subscriber characteristics. A second key is inserted in the subscriber characteristic record. The second key is associated with the characteristic record so that the characteristic record is associated via the second key to the subscriber characteristic record that has been associated via the first key. A characteristic group to characteristic record is created for holding characteristics for a group of subscribers. A third primary key is inserted in the characteristic group. And a fourth key is inserted in the characteristic group for associating with the one characteristic group record so that the characteristic group is associated via the fourth key to the characteristic group that has been associated via the third key.

19 Claims, 16 Drawing Sheets

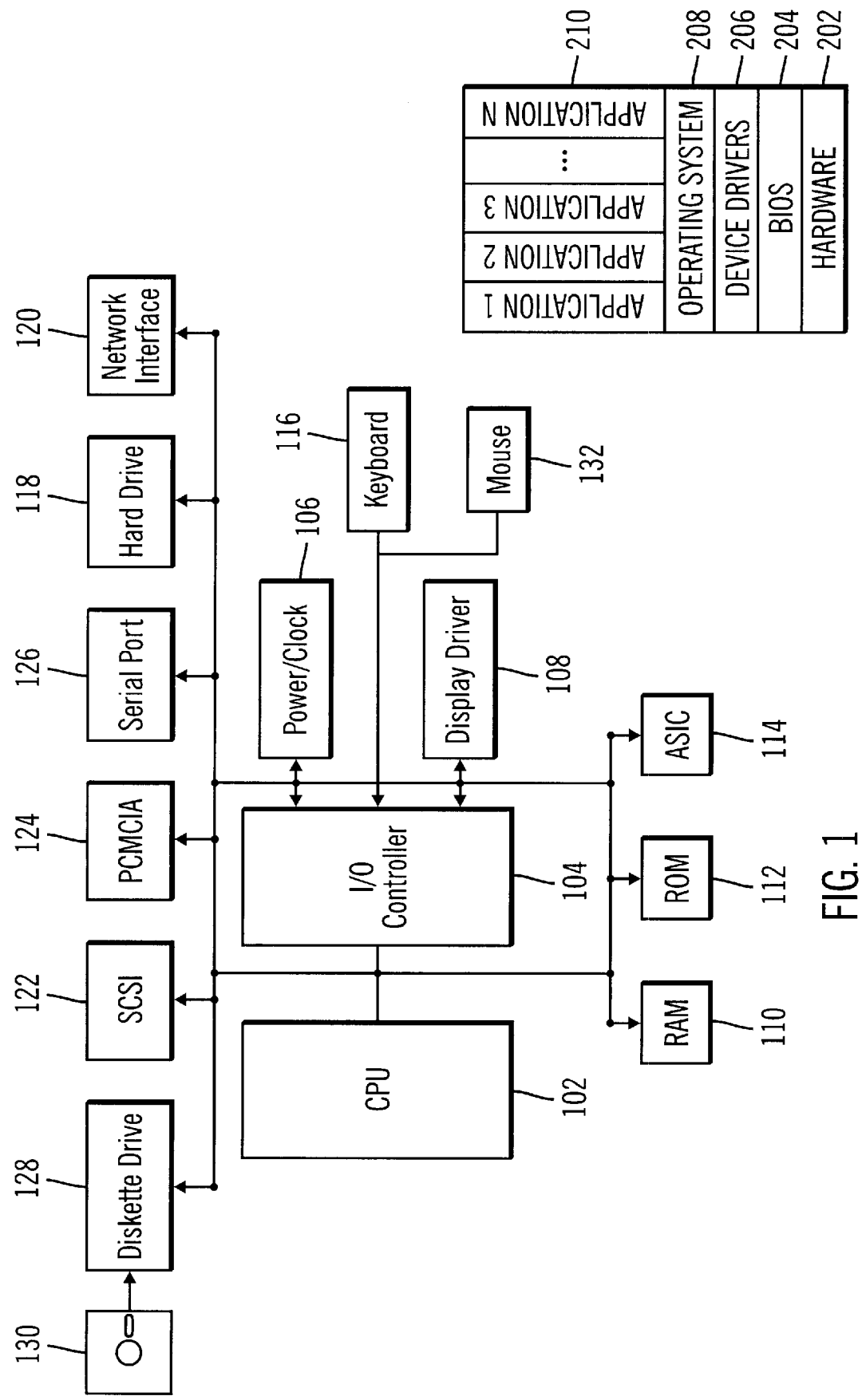

DATA ELEMENT CHARACTERISTICS

CROSS-REFERENCE TO RELATED APPLICATIONS

Not Applicable

BACKGROUND OF THE INVENTION

1. Field of the Invention

The invention disclosed broadly relates to the field of billing and billing systems and more particularly to elements in databases used for customizing subscriber or customer information.

2. Description of the Related Art

Providers of services often want to track subscriber information to be able to provide more focus services. For example, it is common for a subscriber to be asked to respond to a series of questions regarding the subscriber's business information, personal information, hobbies, dislikes and other demographic information. The responses to these series of questions are typically entered into a subscriber profile by a customer service representative. The subscriber profile often is associated with a customer billing system.

In order to facilitate entering the subscriber profile information, a system administrator or other computer personnel for the provider of service must layout the tables and their permitted value types, i.e, whether the value is a string, a list, a numeric, an alpha-numeric as so on. The requirement to have a system administrator or other computer professional customize the subscriber profile information is problematic and burdensome. For each type of service, the system administrator must predefine fields. If the type of information changes for subscriber changes, or if a new type of information is desired to be collected, the system administrator must modify the database records accordingly.

Many times the type of information being collected by customer service representatives does not fit into a pre-defined table. Moreover, additional information being collected by customer service representatives can not be entered into predefined fields, and there is a risk of losing this additional information. Therefore, there is a need for a system and a method, for providers of services, to track certain changeable information about subscribers without the need to create custom tables and data entry forms for each type of data the subscriber wants to track.

Another problem with the profile information being customized by a system administrator is that many base database schema can not be modified. As an example, suppose a provider of service wishes to track the annual income of their subscribers by market segment. If the underlying database schema cannot be modified, this additional information cannot be collected. Accordingly, a need exists for a method and apparatus to overcome this problem.

SUMMARY OF THE INVENTION

The present invention provides the capability to collect, track and monitor any subscriber characteristic required without the need of creating and maintaining separate tables in the database to store the data. The present invention eliminates the need for maintaining different viewing or editing components for different types of data (i.e., strings, numeric values, lookup values, etc.) and all the information collected can be stored in a single table. The present invention provides the ability to store different types of data for subscribers in a single table with a single Data Entry user interface and a Characteristic Configuration user interface.

More specifically, the present invention provides characteristics for subscribers that can be configured using a graphical user interface. The characteristics can be assigned to groups and market groups. Since the user interface for displaying, entering, and modifying and the value for each characteristic creates the correct edit controls for the characteristic dynamically at runtime, the appearance is of a custom form which would have required modification and maintenance every time a new data element was to be tracked.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 1 is a block diagram of the major electronic components of an information processing device according to the present invention.

FIG. 2 is a block diagram illustrating the software hierarchy for the information processing device of FIG. 1 according to the present invention.

DETAILED DESCRIPTION OF AN EMBODIMENT

Figure 3A:
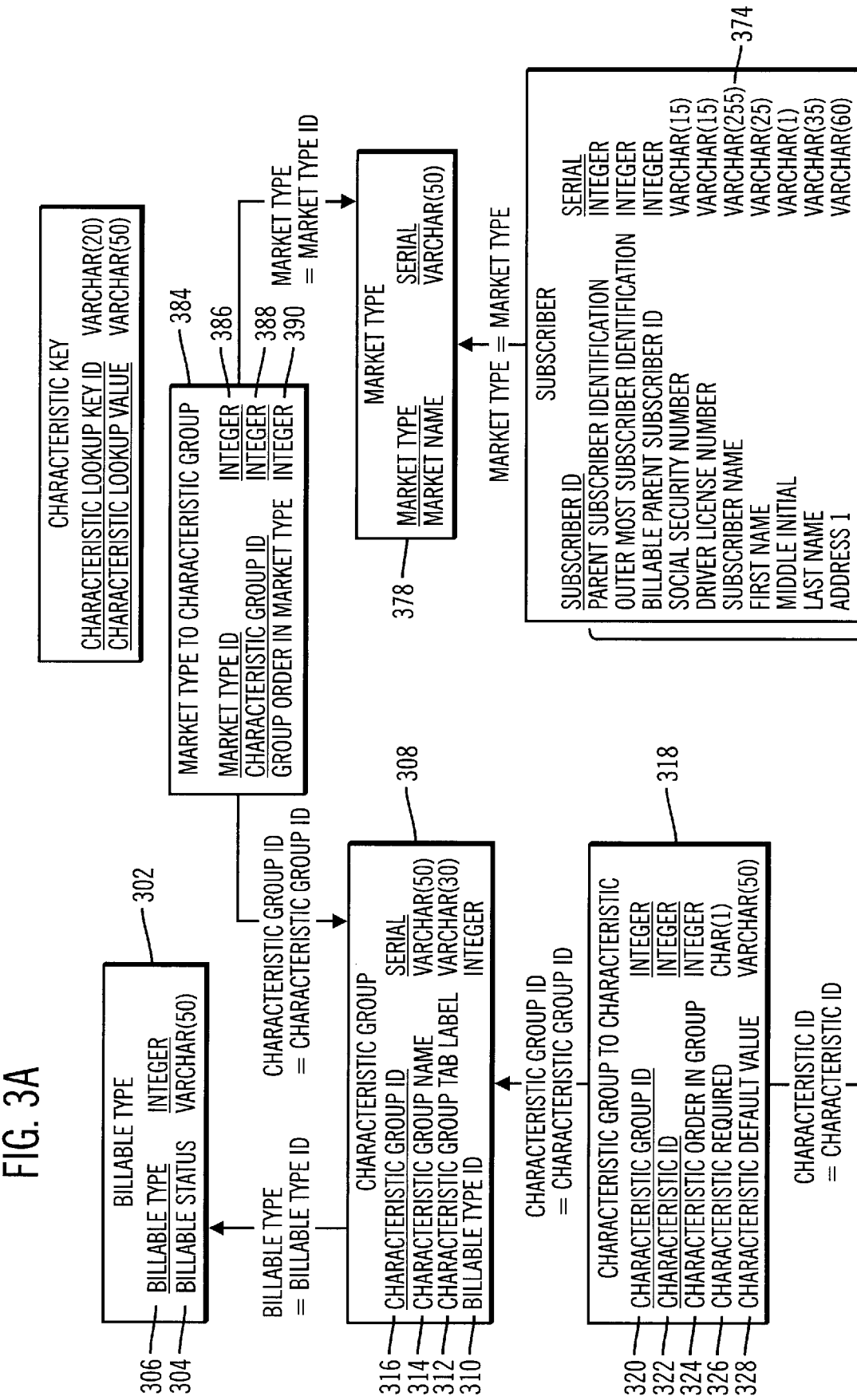
FIG. 3, is database schema of an exemplary data model according to the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Glossary of Terms Used in this Disclosure

Billing System—a system used to calculate charges and request payment from a subscriber or a subscriber's account such as a credit card. Modern Billing Systems also perform may other diversified activities such as service provisioning, credit checks, contract tracking and more. They also hold a wide variety of data such as detailed Subscriber Information, Service Information for each Subscriber, account comments and subscriber demographic information. Delivery—a process of moving a piece of data, formatted by a Rating Engine, to an external system. Delivery may be performed for many reasons, including EDI (Electronic Data Interchange) invoice transmission, credit card settlement, and can be customized to interface with automated systems or manual processes.

Database—A database is a collection of data that is organized so that its contents can easily be accessed, managed, and updated. The most prevalent type of database is the relational database, a tabular database in which data is defined so that it can be reorganized and accessed in a number of different ways.

Service—any item including a good, service, money or the movement thereof, that a Subscriber may use. One class of Service is communication services, such as POTs (Plain Old Telephone Service) line, cable line, cellular line, satellite, T1 or TCP/IP connection or equivalent. Another class of Service is utilities such as gas, oil, electric, water, sewer purchased by a Subscriber. Still, another class of Service is transportation such as ticketing, tolls, freight charges, and shipping charges.

Service Information—another name for Service Data

Service Provider—the entity or organization providing a Service.

Sub-ID—an entry in a database schema for establishing a hierarchal relationship with one or more grouping of entries in the database.

Subscriber—an individual or company that is uniquely identified within the Billing System as a user of services. This could be a cellular phone subscriber, a user of Internet Services or other service user.

Subscriber Characteristics—another name for Subscriber Data.

Subscriber Data—one or more pieces of personal information for a Subscriber such as the name, address, telephone number, E-mail address, county, taxing jurisdiction, terms and conditions of the subscriber and other information directed to the Subscriber.

Subscriber Group—a grouping of one of more Subscribers based on at least on Subscriber Characteristic.

Subscriber Information—another name for Subscriber Data.

Table—a grouping of one or more entries in a Database.

Table Type—a specific class or type of Table in a Database.

Zero-to-Many-Association—a relationship between zero or more tables in a Database Schema where one Table Type may refer to one or more other Table Types.

Billing System Hardware

Referring to FIG. 1, there is shown a block diagram of the major electronic components of an information processing device 100 in accordance with the invention. The electronic components include: a central processing unit (CPU) 108, an Input/Output (I/O) Controller 110, a system power and clock source 112; display driver 114; RAM 102; ROM 104; ASIC (application specific integrated circuit) 106 and a hard disk drive 118. These are representative components of a computer. The general operation of a computer comprising these elements is well understood. Network interface 116 provides connection to a computer network such as Ethernet, TCP/IP or other popular protocol network interfaces. Optional components for interfacing to external peripherals include: a Small Computer Systems Interface (SCSI) port 124 for attaching peripherals; a PCMCIA slot 122; and serial port 120. An optional diskette drive 126 is shown for loading or saving code to removable diskettes 128. The system 100 may be implemented by combination of hardware and software. Moreover, the functionality required for using the invention may be embodied in computer-readable media (such as 3.5 inch diskette 128) to be used in programming an information-processing apparatus (e.g., a personal computer) to perform in accordance with the invention.

FIG. 2 is a block diagram illustrating the software hierarchy for the information processing device 200 of FIG. 2 according to the present invention. The BIOS (Basic Input Output System) 202 is a set of low level of computer hardware instructions for communications between an operating system 206, device driver 204 and hardware 200. Device drivers 204 are hardware specific code used to communicate between and operating system 206 and hardware peripherals such as a CD ROM drive or printer. Applications 208 are software application programs written in C/C++, assembler or other programming languages. Operating system 206 is the master program that loads after BIOS 202 initializes, that controls and runs the hardware 200. Examples of operating systems include Windows 3.1/95/98/NT, Unix, Macintosh, OS/2, Sun Solaris and equivalents. One application running on the operating system 204 is a relational database product such as the Oracle Database server, IBM DB/2, Microsoft SQL Server or equivalent.

The information processing device 200 can be configured as a server coupled to one or more clients through a network. (not shown). The network can be a private Intranet, Internet or other computer network. In the preferred embodiment, the protocol is HTTP (Hyper Text Transfer Protocol) and the exact hardware/software protocol is not important to this present invention and should not be limited. The clients are capable of running Microsoft Windows 3.1/95/98/NT or equivalent operating systems.

Application Overview

In one embodiment the present invention is an application 208 with a graphical user interface, the data logic layer and the back-end relational database. The building of a subscriber characteristic begins with an initial request for a new characteristic or to modify an existing characteristic. The process begin with a data logic layer being filled-in by requesting characteristic relationships, constraints and presentation information from the relational database. Using this information, the data logic layer constructs the user interface allowing dynamic data-aware controls to be created for gathering input from the end-user of process and storing the resulting information back to the database.

Database Schema

Figure 3B:
Figure 6:
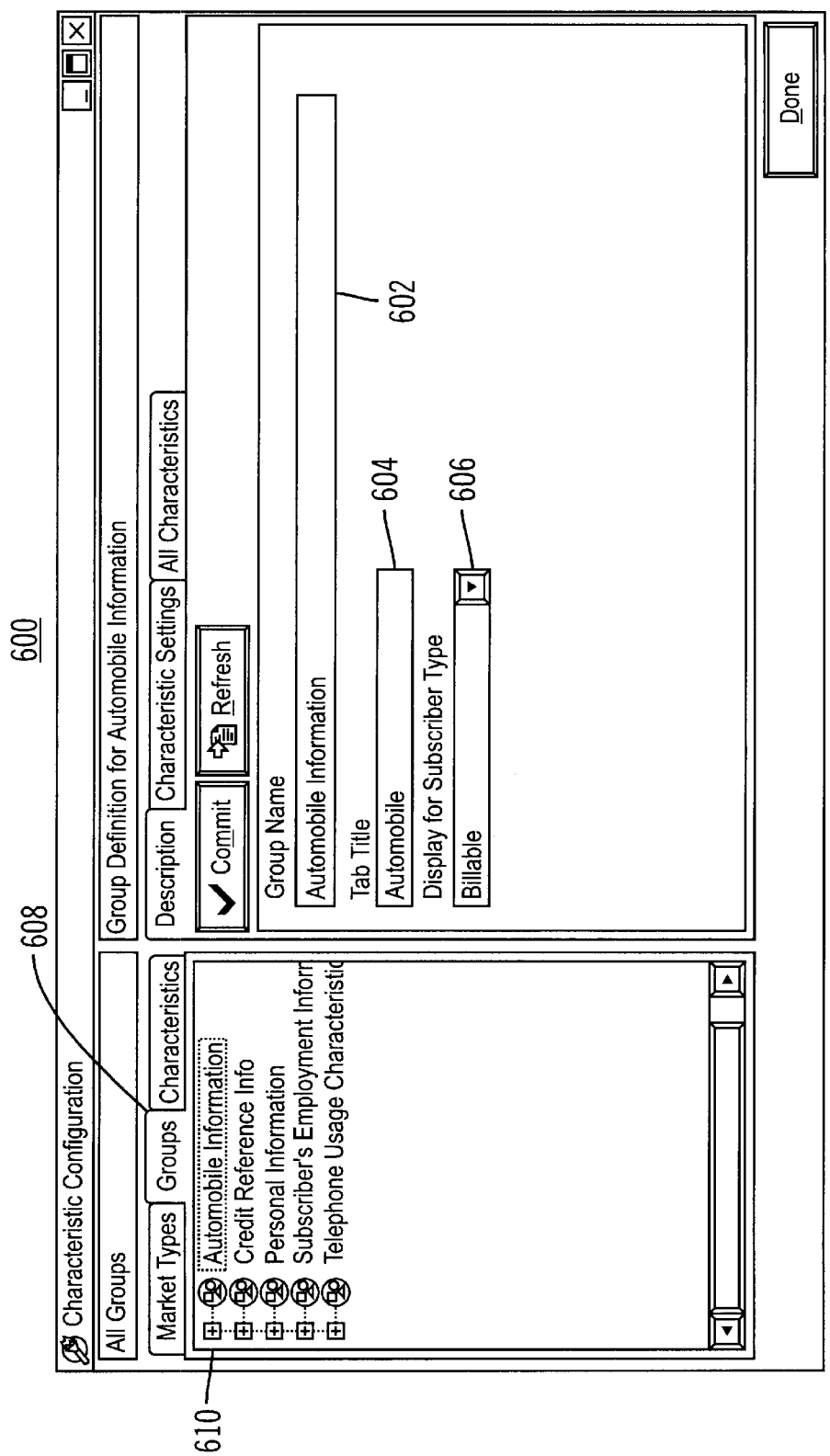
FIG. 6 is an illustration of a graphical user interface for the configuration of the table for Characteristic Groups, according to the present invention.

A standard application 204 running on the exemplary hardware 100 is now described. Turning to FIG. 3, shown is a database schema 300 of an exemplary data model according to the present invention. The top of the database schema is a table Billable Type 304. Billable Type 304 stores information about a lists of status. In this embodiment, the status can be one of three type, billable, non-billable or both. As shown in FIG. 6 this status is edited with a GUI. An entry Billable Type 306 is used as a primary key identifier to Billable Type ID 310 in the table Characteristic Group 308. The type of relationship between the Characteristic Group 308 to Billable Type 302 is a zero-to-many-association. Stated differently, there can be one or more tables Characteristics Group 308, associated with a Billable Type 306.

The table Characteristics Group 308 stores information about Subscribers Characteristic including a primary key used for table Characteristic Group 318; a Characteristic Group Name 314 which is a user definable name for the Characteristics Group 308; a Characteristic Group Tab Label 312 which is the text displayed in the Group's Tab Title; and Billable Type ID 310 which determine whether this Characteristics Group 308 is displayed for billable subscribers, non-billable subscribers or both. There is a zero-to-many-association between the table Characteristic Group 308 to table Characteristic Group to Characteristics 318.

The table Characteristic Group to Characteristic 318 stores the relationships between subscriber groups and subscriber characteristics. The Characteristic Group ID 318 includes: a Characteristic Group ID 320 which identifies the subscriber group and is the primary key into the table Characteristics 330; a Characteristic ID 322 which identifies the subscriber characteristics; a Characteristic Order in Group 324 which indicates the order in which the Characteristic is displayed within the Characteristic Group 308; a Characteristic Required 326 for identifying if this particular zero-to-many-association of Characteristic Group to Characteristic 318 is displayed; and Characteristic Default Value for providing a default value for this subscriber characteristic. There is a zero-to-many-association between the table Characteristic Group to Characteristic 318 to table Characteristics 330.

The table Characteristics 330 stores one or more subscriber characteristics in table Subscriber Characteristics 362. The table Characteristics 330 includes: a Characteristic ID 332 which is a primary key for a Subscriber Characteristic 362; a Characteristic Name 332; a Characteristic Tag 334 which is a code value for a Characteristic used to identify a characteristic in a plug-in application program; a Result Type 336 a data entry type for the Subscriber Characteristic 362 with four types of data entry in this embodiment (i) normal text, (ii) encrypted text, (iii) characteristic lookup table and (iv) database lookup table; a Characteristic Description 340 additional description text for the Subscriber Characteristic 362; a Position Key 342 a characteristic position during display; a Lookup Table 344 a table name for database lookup table characteristic of Result Type 338; a Lookup Key 346 a key field for Lookup Table Characteristics of Result Type 338; a Lookup Result 348 a result field for database lookup table characteristics of Result Type 338; a Characteristic Mask 348 an edit mask for Text Characters of Result Type 336; a Characteristic Display 350 a display test present to the customer service representative for entering a Subscriber Characteristic 362; a Where Clause 354 used for selecting lookup values from a Database Lookup Table of Result Type 338; an Order Clause 355 used for ordering lookup value retrieved from a Database Lookup Table; a Result Length 356 is the maximum length of the result filed to be store in the Subscriber Characteristics table; a Start Date Time 358 is the beginning date for the Subscriber Characteristic 362; and an End Date Time 360 the end date for the Subscriber Characteristic 362. There is a zero-to-many-association of Subscriber Characteristic 362 to Characteristics 330.

The table Subscriber Characteristics 362 holds the subscriber characteristics. The table Subscriber Characteristics 362 includes a composite key comprising (i) the Subscriber ID 364 and (ii) a Characteristic ID 366; and a Characteristic Value 368 which is the data entered and stored. There is a zero-to-many-association between the Subscriber Characteristic 362 and the Subscriber 370.

The table Subscriber 370 holds the subscriber information 372 such as social security number, driver license number, name, address, phone numbers, job information and more. The exact information in the table Subscriber is not important in the understanding of the current invention, and those skilled in the art will recognize many substitutions. In addition, the Subscriber ID 374 which is a primary key to the table Subscriber Characteristics 362 there is a Market Type 376 which is a primary key to the table Market Type 378. There is a zero-to-many-association between the table Subscriber 370 to the table Market Type 378.

An example is now described to assist in understanding the hierarchal relationship of the tables in database schema 300. Suppose a provider of service wishes to collect information on a subscriber about their motor vehicles. For this instance, the subscriber is subscribers, the characteristic group 308 for motor vehicles with a Characteristic Group ID 316. The Characteristic Group ID 316 is a is a primary key 332 into Characteristic Table 330. Characteristic Description 338 is "Vehicle Color," the Characteristic Display 348 for the customer service representative is "What Color is Your Car?" and in this example if the subscribers vehicle color is blue, it is stored in the characteristic value 368 of Subscriber Characteristic table 362. It should be understood that the Characteristics 330 for the subscriber can be easily setup and customized for any subscriber characteristic. Moreover, any type of value or entry for a characteristic is permitted. The underlaying database schema is structured to give total flexibility in defining the result types for questions about characteristics. The result types for a characteristic can take one of four forms:

1. Encrypted open text of a defined maximum length and optional edit mask.
2. Non-encrypted open text of a defined maximum length and optional edit mask.
3. Result of a defined data selection from an existing database table.
4. Result of a user defined list of values.

Result type two and three will take the form of a drop down list box. Result type one will take the form of a text edit control.

It should be understood from the database schema 300 that using the hierarchal table definition the following features are realized and are fully customizable:

What information to track (phone #s, dates, strings, dropdown selections, numeric values, and equivalent.)

Unique questions (Display Text) to be displayed for each Characteristic

Help information for each Characteristic (to assist data entry personnel in knowing exactly what type of information is being requested or it's format or context).

The entry method of the information to track (Text or Drop-Down Lists)

The source of Drop-Down List items (custom Characteristic Lookup Table or SQL selection from other database tables)

The maximum string length of the value that can be entered.

A custom mask to be applied to this Characteristic while being edited.

Whether or not the Characteristic is to be displayed as **** and encrypted in the database.

Start and End Dates for each Characteristic

Whether each Characteristic is Required or Optional in a Group (can be Required in one Group, but Optional in another Group)

A Default Value for each Characteristic in a Group (can have different Default Values for different Groups)

The Grouping of Characteristics onto Group Tabs with customizable Tab Text (up to 30 characters)

Whether each Group applies to (is displayed for) certain types of Users (in the BillPlex implementation these are Billable Subscribers, Non-Billable Subscribers, or Both)

The order in which the Characteristics are displayed in a Group.

The order in which the Group Tabs appear in a Super Group (Market Type in the BillPlex implementation.)

Using the tables defined in database schema 300, the administrator can perform the following:

Creating New Subscriber Characteristics

Editing Subscriber Characteristics

Copying Subscriber Characteristics

Deleting Subscriber Characteristics

Creating Characteristic Groups

Editing Characteristic Groups

Copying Characteristic Groups

Deleting Characteristic Groups

Creating New Market Types (calls the old Market Type maintenance form up)

Assigning Subscriber Characteristics to Characteristic Groups

Unassigning Subscriber Characteristics from Characteristic Groups

Assigning Characteristic Groups to Market Types

Unassigning Characteristic Groups from Market Types

Changing the Order in which Characteristics will be displayed in a Group.

Changing the Order in which Group Tabs will be Displayed in a Market Type.

Exemplary Screen Shots Utilizing the Database Schema

Figure 4:
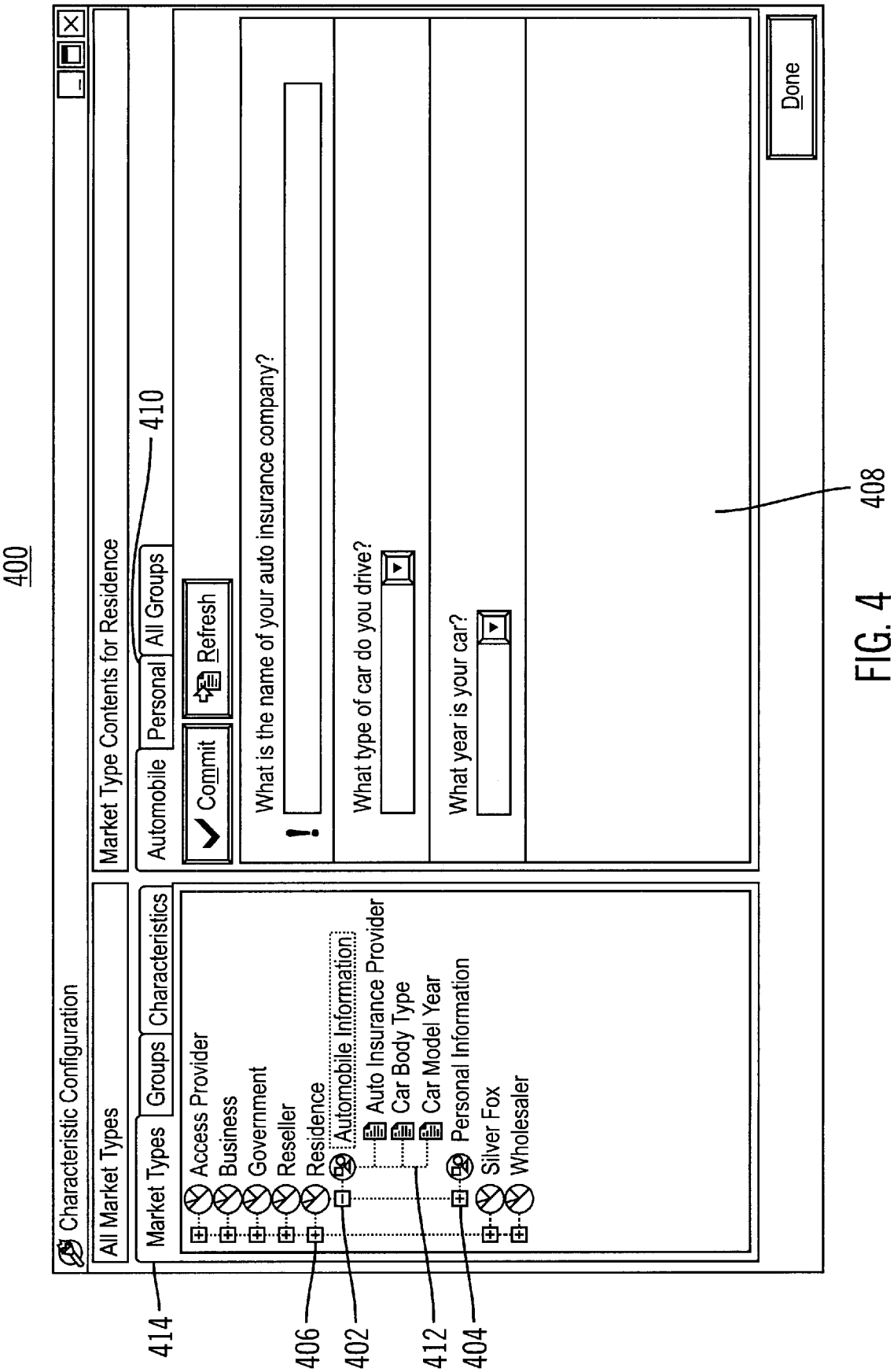
FIG. 4 is an illustration of a graphical user interface for the assignment of a table Characteristic Group to a table Market Type utilizing the database schema, according to the present invention.

Turning now to FIG. 4 shown is an illustration 400 of a graphical user interface for the assignment of a table Characteristic Group 308 to a table Market Type 384 utilizing the database schema 300, according to the present invention. On the left, the tab for Market Type 412 corresponding to the table Market Type to Characteristic Group 384 and Characteristic Group to Characteristic 318 is expanded to reveal that two groups, Automobile Information 402 and Personal Information 404 are assigned to the Residence Market Type 406. The Automobile Information Characteristic Group 402 is also expanded to show that there are three characteristics 412 corresponding to table Characteristics 330. On the right is an illustration 408 of how the Characteristics will look at runtime in the Characteristic Entry user interface. This is shown in more detail in FIG. 15 below. Note that all the tab for Groups 410 on the right side are used for assigning Characteristic Groups 318 to Market Types 384 and tabs 410 will not be displayed in the characteristic entry user interface of FIG. 15.

Figure 5:
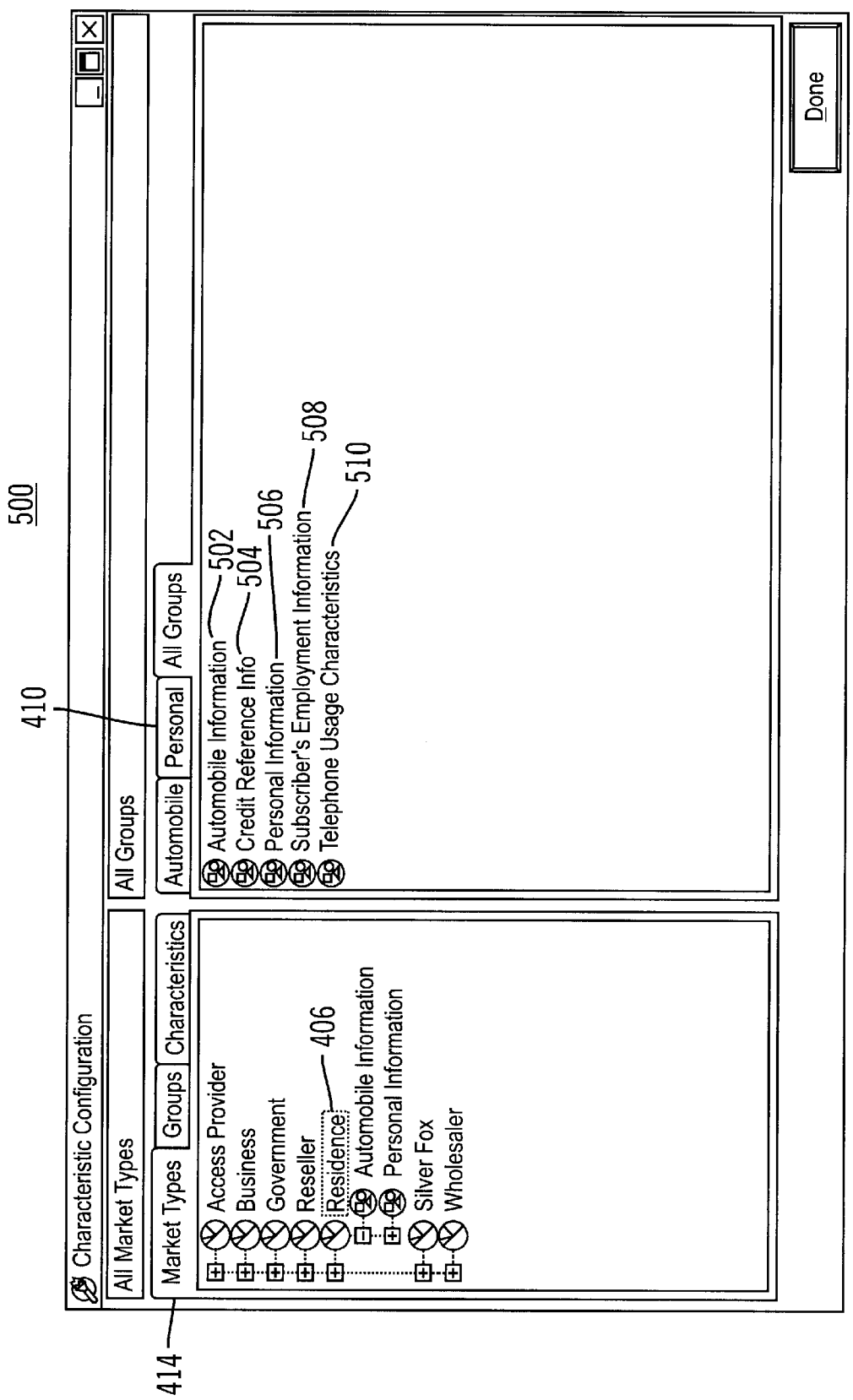
FIG. 5 is an illustration 500 of the drag and drop functionality of the graphical user interface for the assignment of a table for Characteristic Group to a table for Market Type of FIG. 4, according to the present invention.

FIG. 5 shown is an illustration 500 of the drag and drop functionality of the graphical user interface for the assignment of a table for Characteristic Group 308 to a table for Market Type 384 of FIG. 4, according to the present invention. All tabs for Groups 410 on the right side displays all of the tables for Characteristic Groups 318 that have been configured in the system. In this example the tables for Characteristic Groups 318 are Automobile Information, Credit Reference Info 504, Personal Information 506, Subscriber's Employment Information 508, and Telephone Usage Characteristics 510. In order to assign a Characteristic Group 308 to a Market Type 384, the user drags the desired Characteristic Group (ex. 502, 502, 506, 508, 510) from the right side and drop it onto the desired Market Type 484 on the left. Shown the Characteristic Group of Automobile 502 and Personal Information 506 have been associated with the Market Type 412 of Residence 406.

FIG. 6 is an illustration 600 of a graphical user interface for the configuration of the table for Characteristic Groups 308, according to the present invention. To configure the Group Name 602, Tab Title 604, and Display for Subscriber Type 606 properties of a table for Characteristic Group 308, the user selects the desired Characteristic Group 308 on the left and then edit the properties on the right. In this example, tab 608 for group of Automobile Information Group 610 is highlighted and the administrator fills in the information on the right 612.

Figure 7:
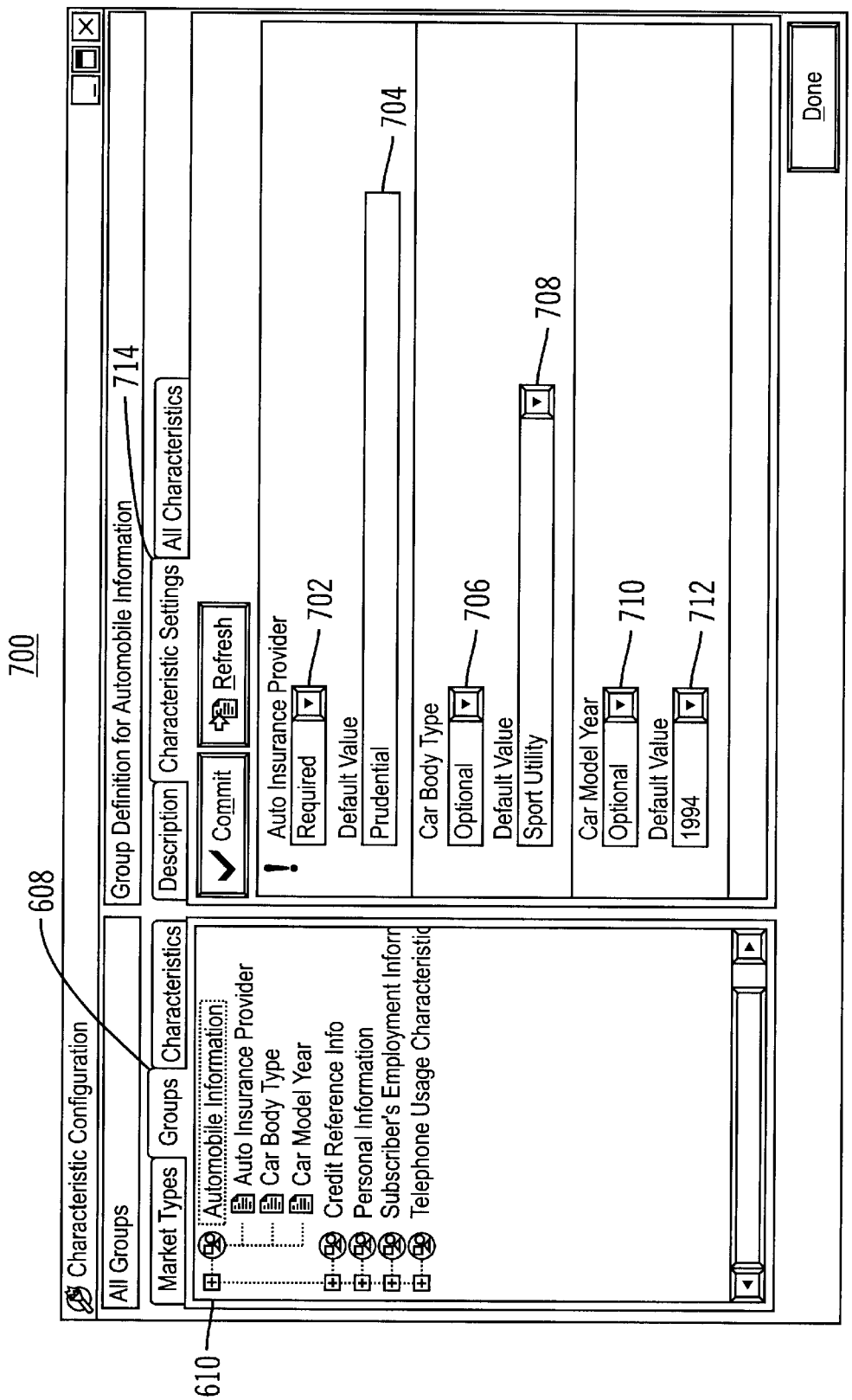
FIG. 7 is an illustration of a graphical user interface for the configuration of a table for Characteristic to specific to its assignment to a certain Group, according to the present invention.

FIG. 7 is an illustration 700 of a graphical user interface for the configuration of the a table for Characteristic 330 to specific to its assignment to a certain Group 608, according to the present invention. To configure whether the Characteristic 330 is required or optional and its default Value 704 for this Group 608, the administrator selects the desired Characteristic Group 608 on the left and then edit the properties in the characteristic settings on the right.

Figure 8:
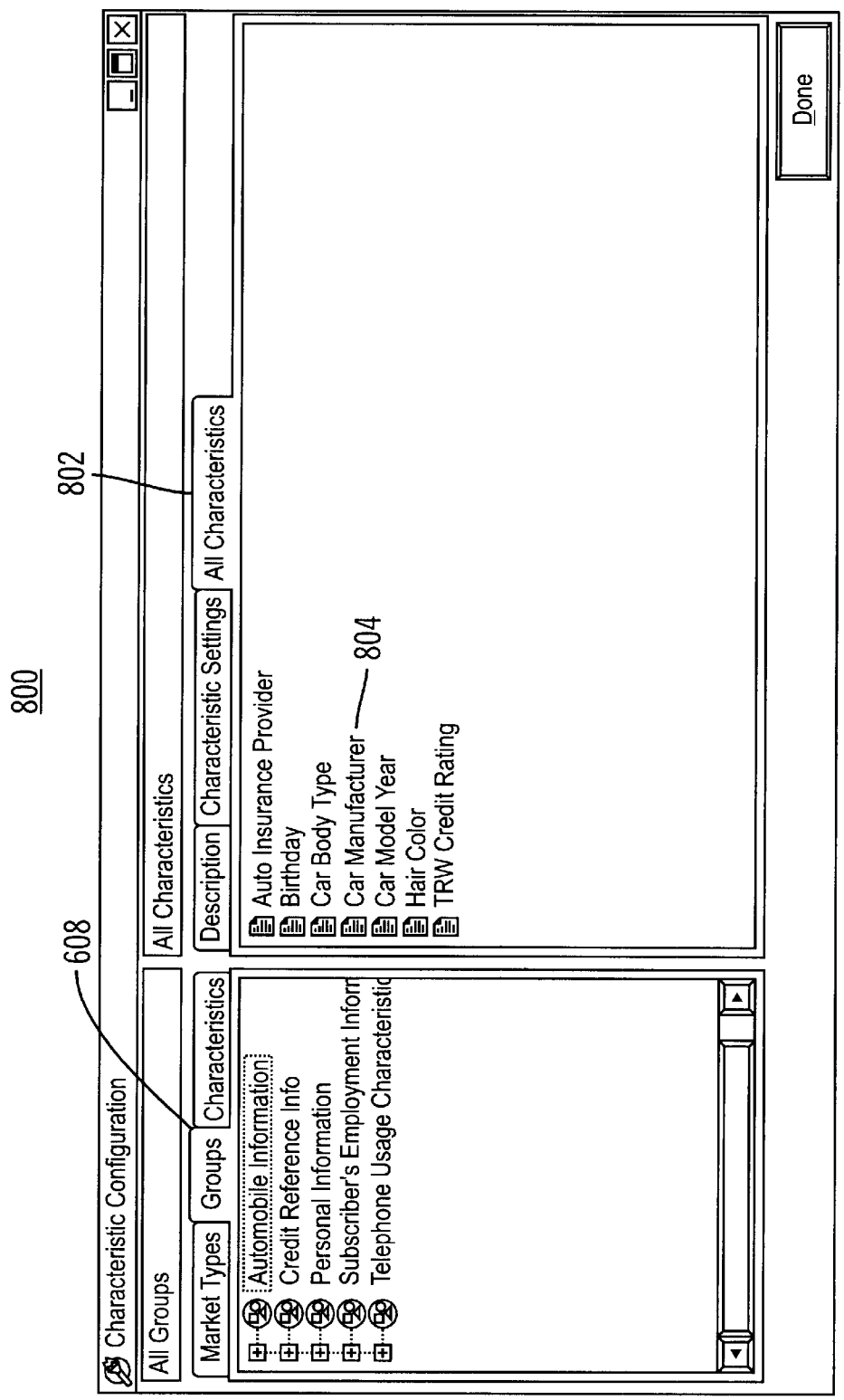
FIG. 8 is an illustration of a graphical user interface of how a table for Characteristics are assigned to a table for Characteristic Group, according to the present invention.

FIG. 8 is an illustration 800 of a graphical user interface of how Characteristics 330 are assigned to a Characteristic Group 308, according to the present invention. Drag and drop functionality is used for assignment. The tab for Characteristics 802 on the right side displays all of the Characteristics 804 that have been configured in the system. To assign a Characteristic 804 to a Group 608, the user would drag the desired Characteristic 804 from the right side and drop it onto the desired Group 608 on the left.

Figure 9:
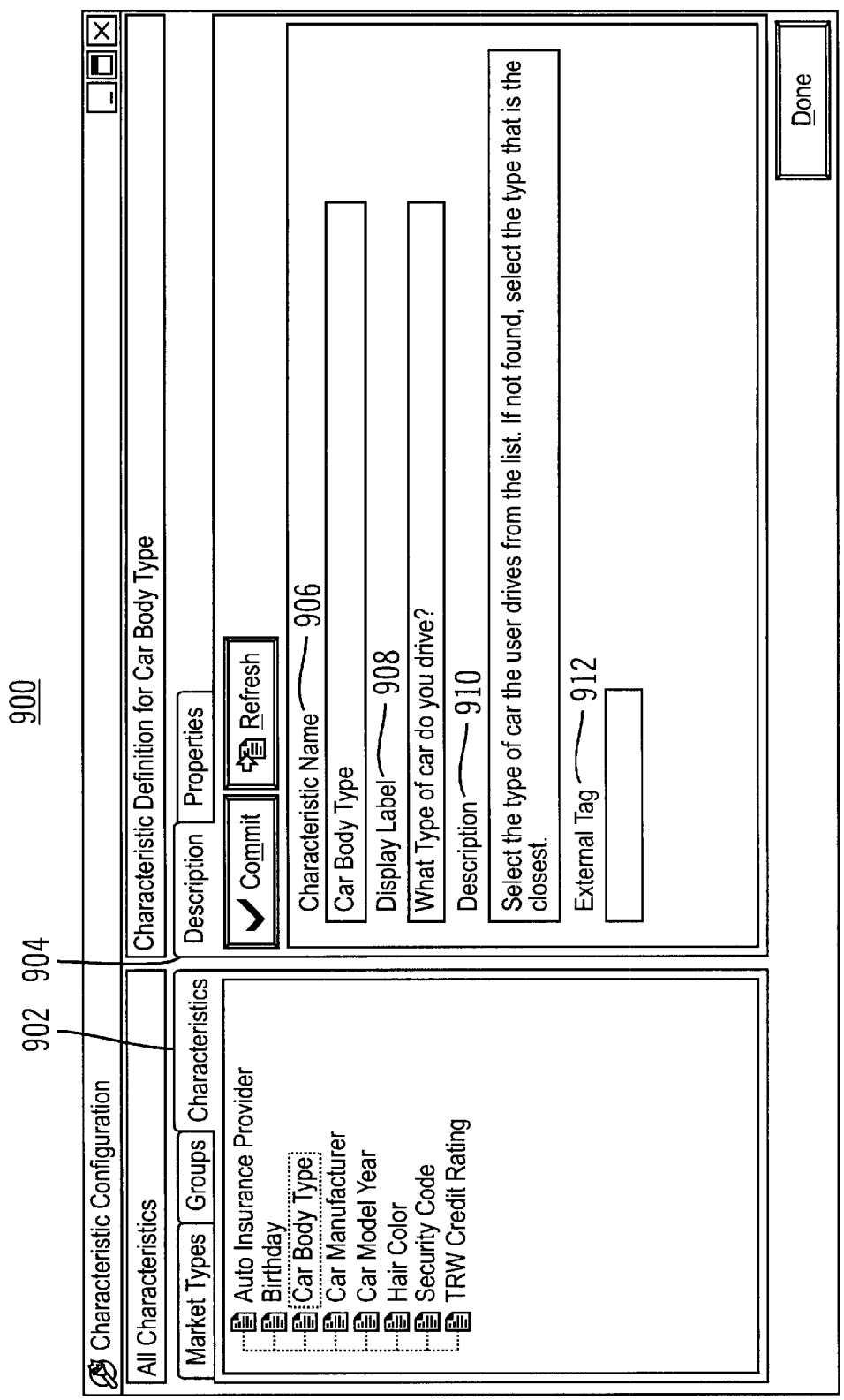
FIG. 9 is an illustration of a graphical user interface of how the configuration of the table for Characteristics for descriptions is entered, according to the present invention.

FIG. 9 is an illustration 900 of a graphical user interface of how the configuration of the table for Characteristics 330 for descriptions is entered, according to the present invention. To configure the Characteristic Name 906, Display Label 908, Description 910 and External Tag 912 properties of a Characteristic 904, the user would select (highlight) the desired Characteristic 904 on the left and then edit the properties on the right.

Figure 10:
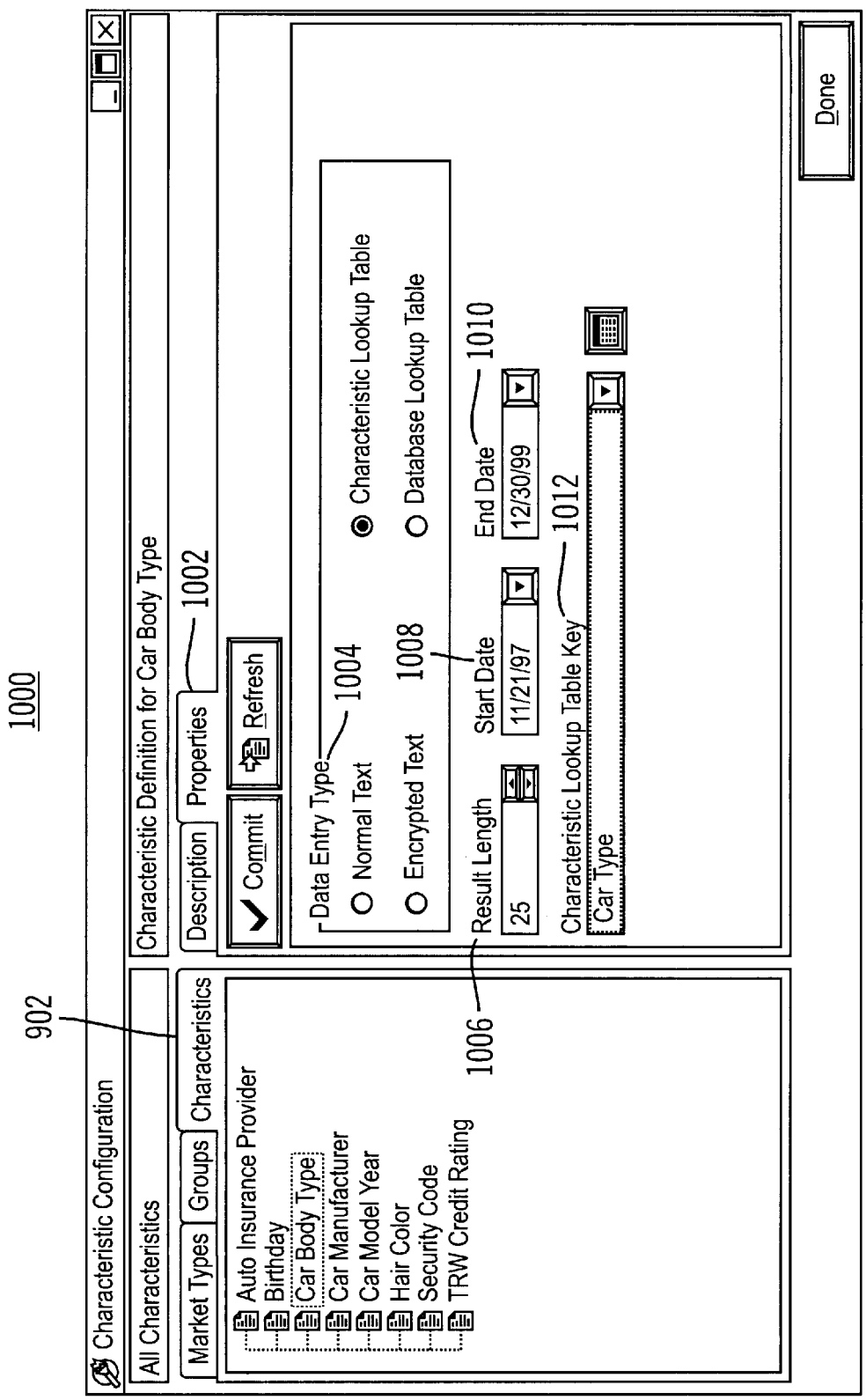
FIG. 10 is an illustration of a graphical user interface of how the further configuration of the table Characteristic for properties is entered for a Data Entry Type is Characteristic Lookup Table, according to the present invention.

FIG. 10 is an illustration 1000 of a graphical user interface of how the further configuration of the table Characteristic 330 for properties is entered for a Data Entry Type or Result Type 338 is Characteristic Lookup Table, according to the present invention. To configure the Data Entry Type or Result Type 38, Result Length 356, Start Date 358, End Date 360 and Lookup Table 344 properties of a Characteristic 330, the user would select (highlight) the desired Characteristic 902 on the left and then edit the properties 1002 on the right, 1004–1012.

Figure 11:
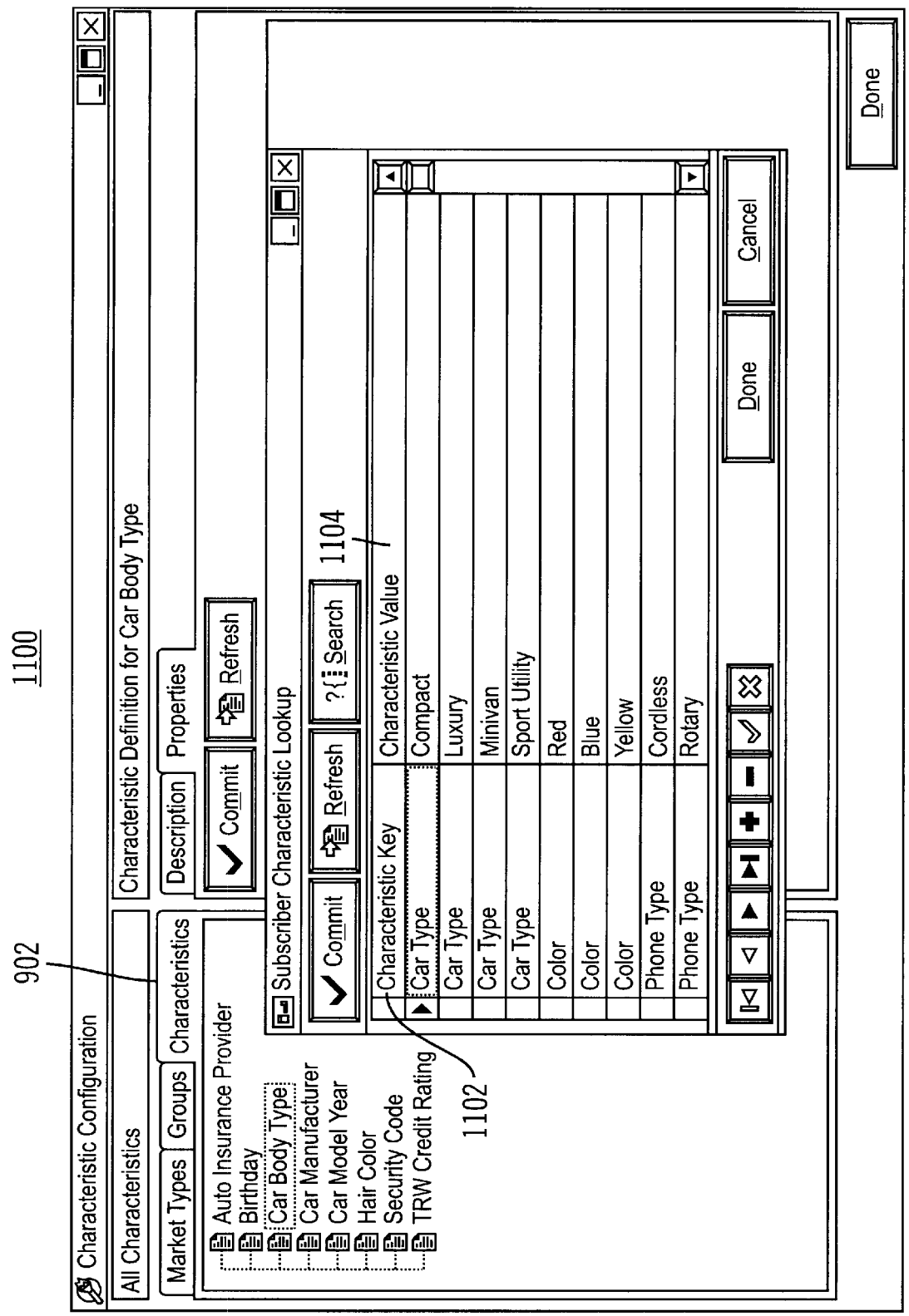
FIG. 11 is an illustration of a graphical user interface for an exemplary Lookup Table in the table for Characteristics, according to the present invention.

FIG. 11 is an illustration 1100 of a graphical user interface for an exemplary Lookup Table 342 in the table for Characteristics 330, according to the present invention. The use of a Lookup Table 342 in the Characteristics 330 provides lookup values that may not already be elsewhere in the database schema 300. The values that drop-down for user selection are in the field Characteristic Value 1104 and the Characteristic Key 1102 is used in order to select a subset of characteristic values for user selection. In this example, the Characteristic Key 1102 has an entry "Car Type" with Characteristic Value 1104 of "Compact," "Luxury," "Minivan," "Sport Utility." In this example, the Characteristic Lookup Table Key 1012 corresponds to the Characteristic Lookup Table Key 1012 of FIG. 12.

Figure 12:
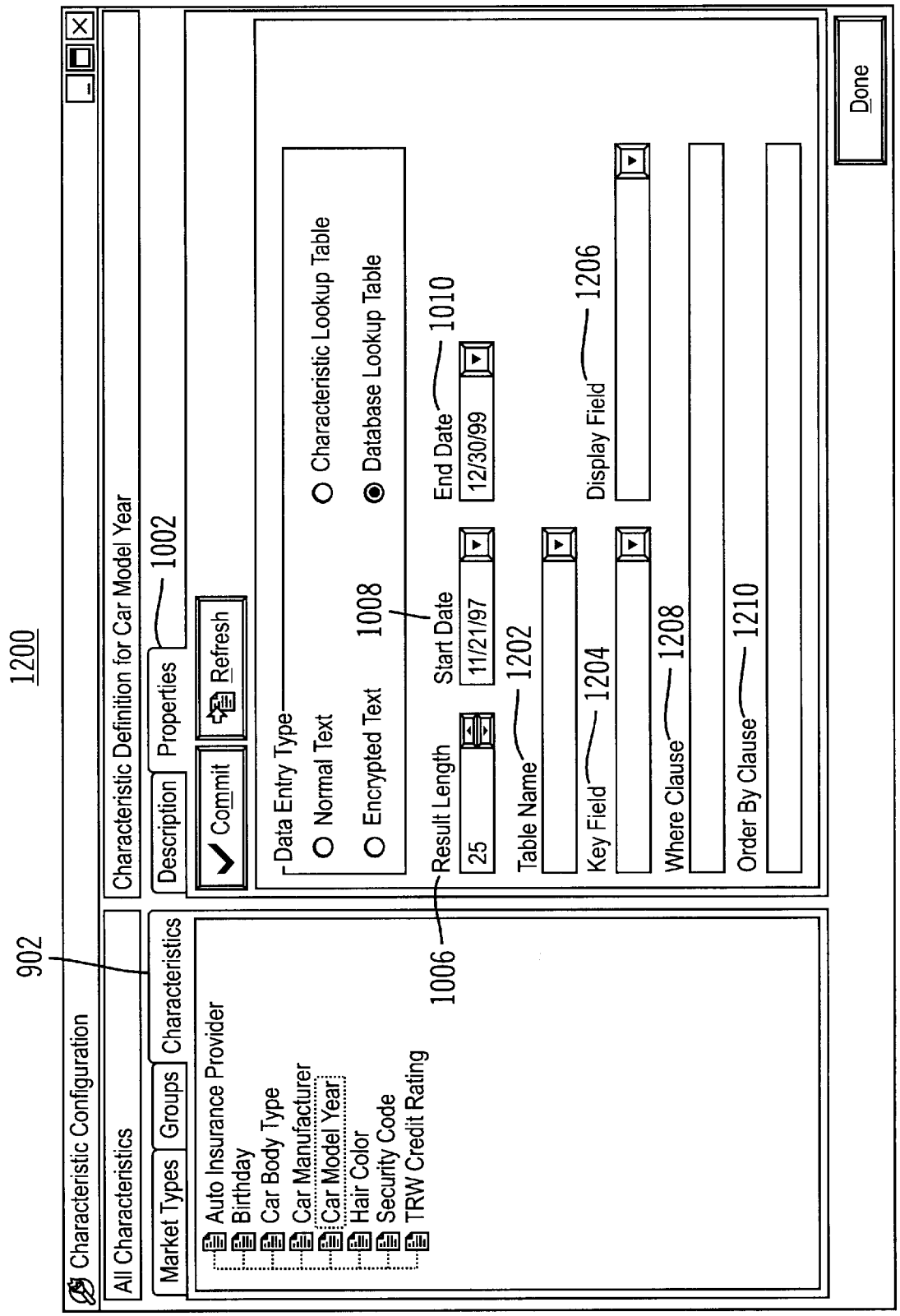
FIG. 12 is an illustration of a graphical user interface for a Lookup Key in the Characteristic, according to the present invention.

FIG. 12 is an illustration 1200 of an exemplary graphical user interface for a Lookup Key 344 in the Characteristic 330, according to the present invention. This screen shows the further configuration of a Characteristic 330 whose Data Entry Type or Result Type 338 is Database Lookup Table. The database query in this example is based on Oracle SQL. To configure the Data Entry Type or Result Type 338, Result Length 356, Start Date 358, End Date 360, Table Name 342, Key Field 344, Display Field 348, Where Clause 352, and Order By Clause 354 properties of a Characteristic 330, the user would select the desired characteristic on the left and then edit the properties on the right. The Database Lookup Table Data Entry Type is provided for cases when the provider of service wants to provide lookup values for user selection that already exist in the database. They can select the Table Name 1202, the Key Field 1204, Display Field 1206 and also add additional SQL code for the Where 1208 and Order By 1210 clauses.

Figure 13:
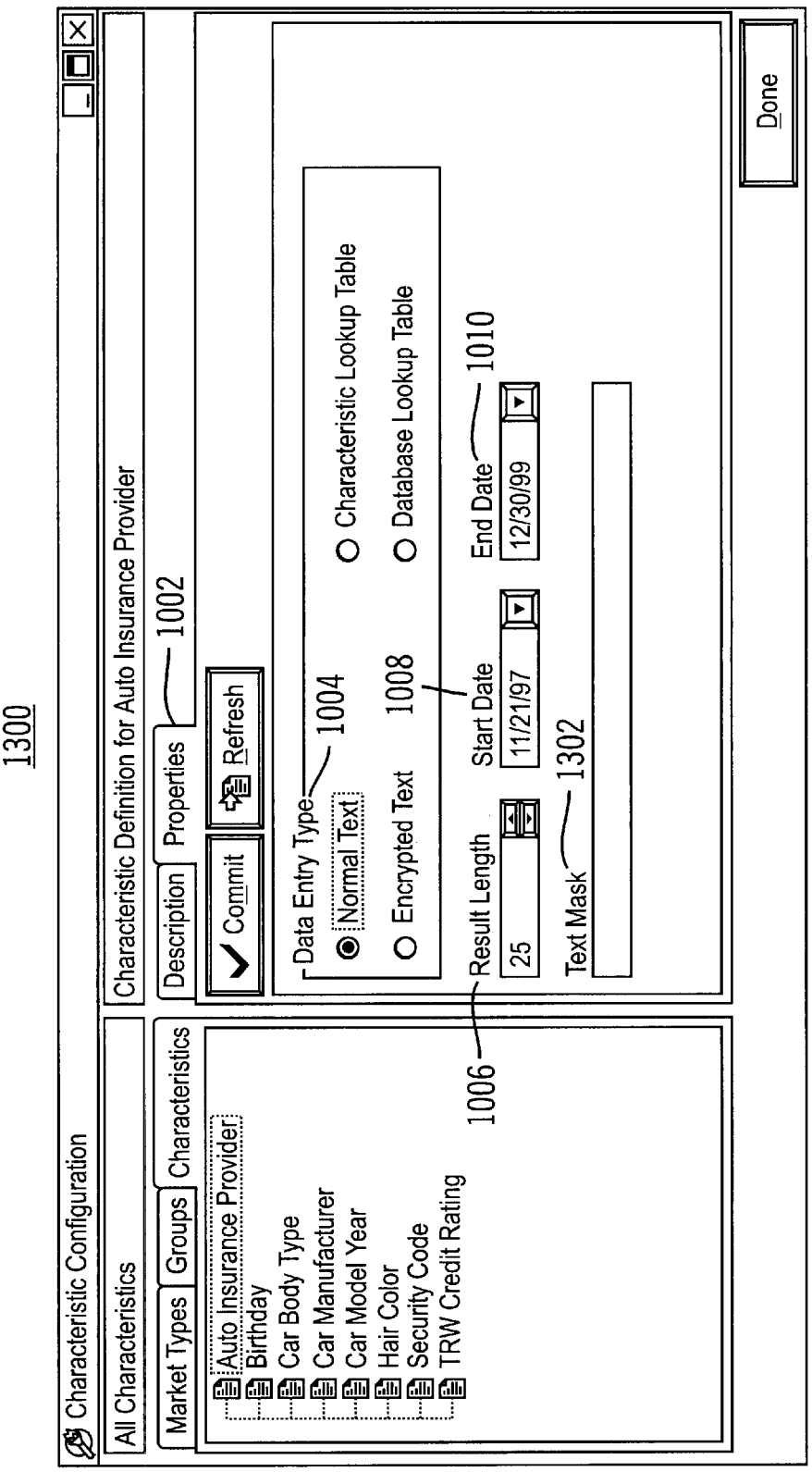
FIG. 13 is an illustration of a graphical user interface for further configuration of a Characteristic whose Data Entry Type is Normal Text, according to the present invention.

FIG. 13 is an illustration 1300 of a graphical user interface for further configuration of a Characteristic whose Data Entry Type or Result Type 338 is Normal Text, according to the present invention. To configure the Data Entry Type or Result Type 338, Result Length 356, Start Date 358, End Date 360 and Text Mask 348 properties of a Characteristic 330, the user would select (highlight) the desired Characteristic on the left and then edit the properties on the right. A text edit mask can be provided in order to assist or format the entry of data, such as formatting a social security number as 999–99–9999.

Figure 14:
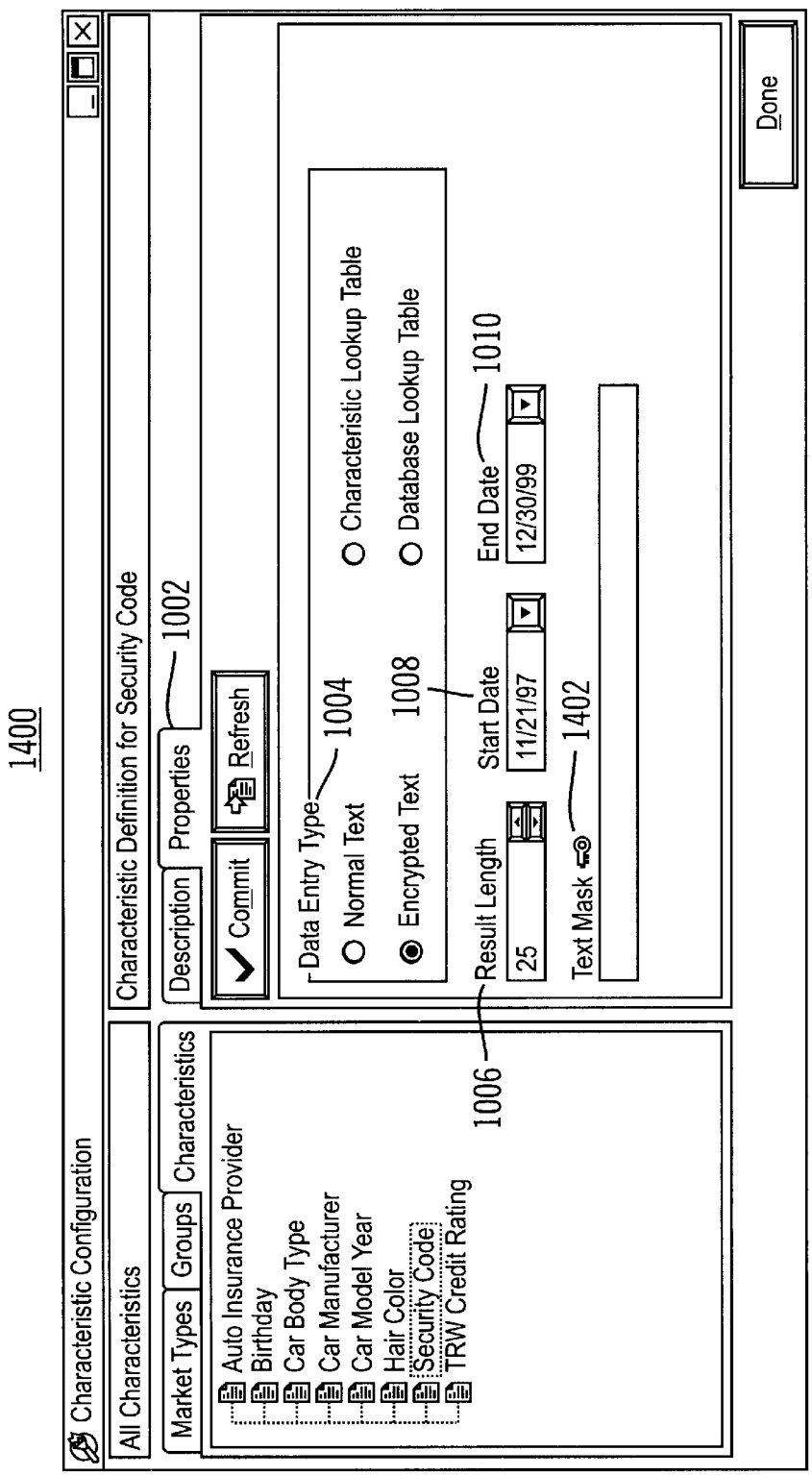
FIG. 14 is an illustration of a graphical user interface for further configuration of a Characteristic whose Data Entry Type is Encrypted Text.

FIG. 14 is an illustration 1400 of a graphical user interface for further configuration of a Characteristic 330 whose Data Entry Type or Result Type 338 is Encrypted Text. To configure the Result Length 356, Start Date 358, End Date 360 and Lookup Table 344 Data Entry Type, Result Length 356, Start Date 358, End Date 360and Text Mask 348 properties of a Characteristic 330, the user would select (highlight) the desired Characteristic 902 on the left and then edit the properties on the right. A text edit mask can be provided in order to assist or format the entry of data, such as formatting a social security number as 999–99–9999.

Figure 15:
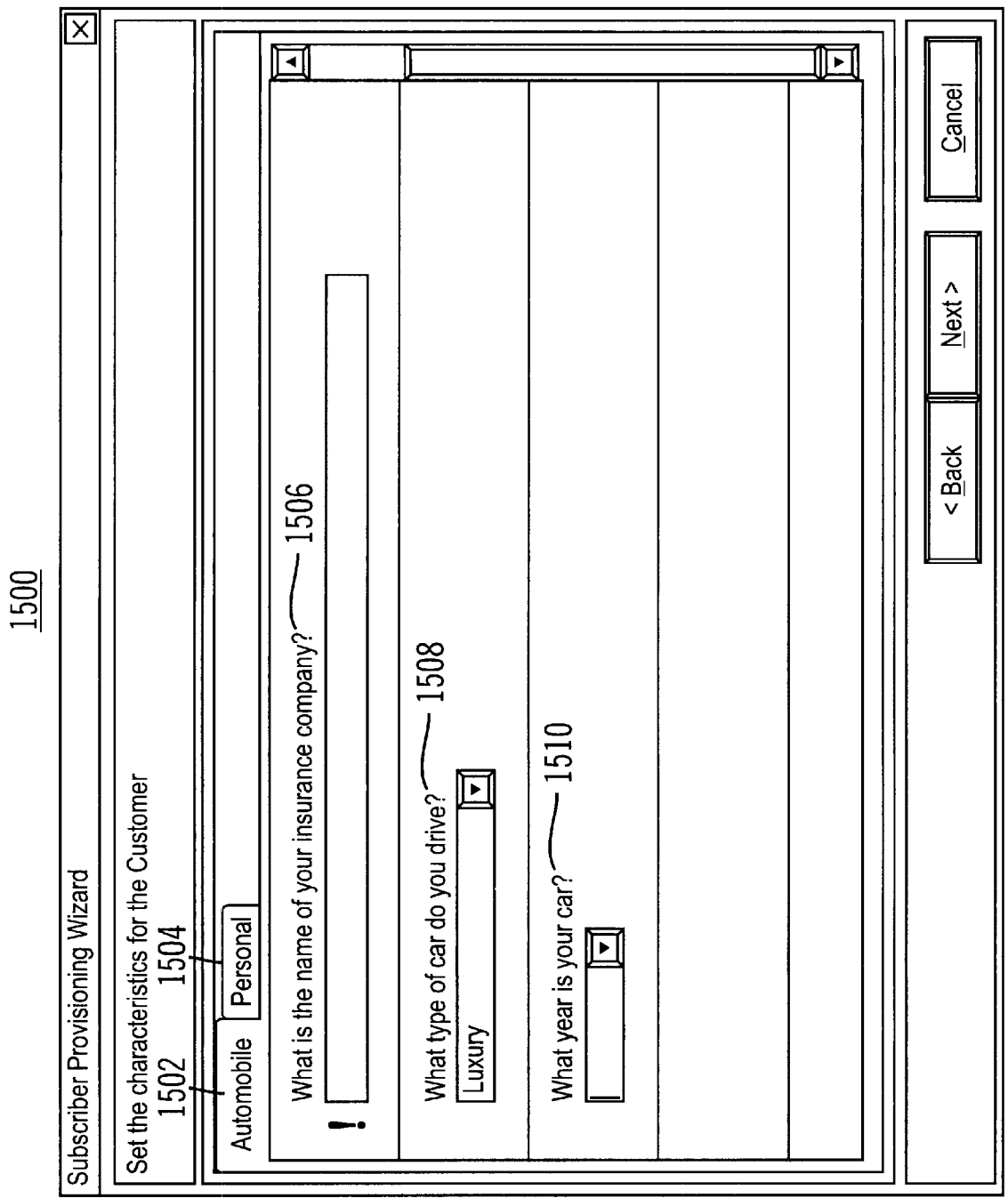
FIG. 15 is an illustration of a first exemplary graphical user interface for the runtime data entry user interface for Characteristics, according to the present invention.

FIG. 15 is an illustration 1500 of a first exemplary graphical user interface for the runtime data entry user interface for Characteristics 330, according to the present invention. In this example, there are two Characteristic Groups for this Subscriber, Automobile 1502 and Personal 1504. Shown here is the Automobile Characteristic Group 1502 which has three Characteristics 1506,1508 and 1510 on it. The Characteristic whose Display 350 is "What is the name of your insurance company?" is required. In this embodiment, the exclamation mark indicates that a value has not yet been entered for this Characteristic and it will change to a checkmark after a value has been entered.

Figure 16:
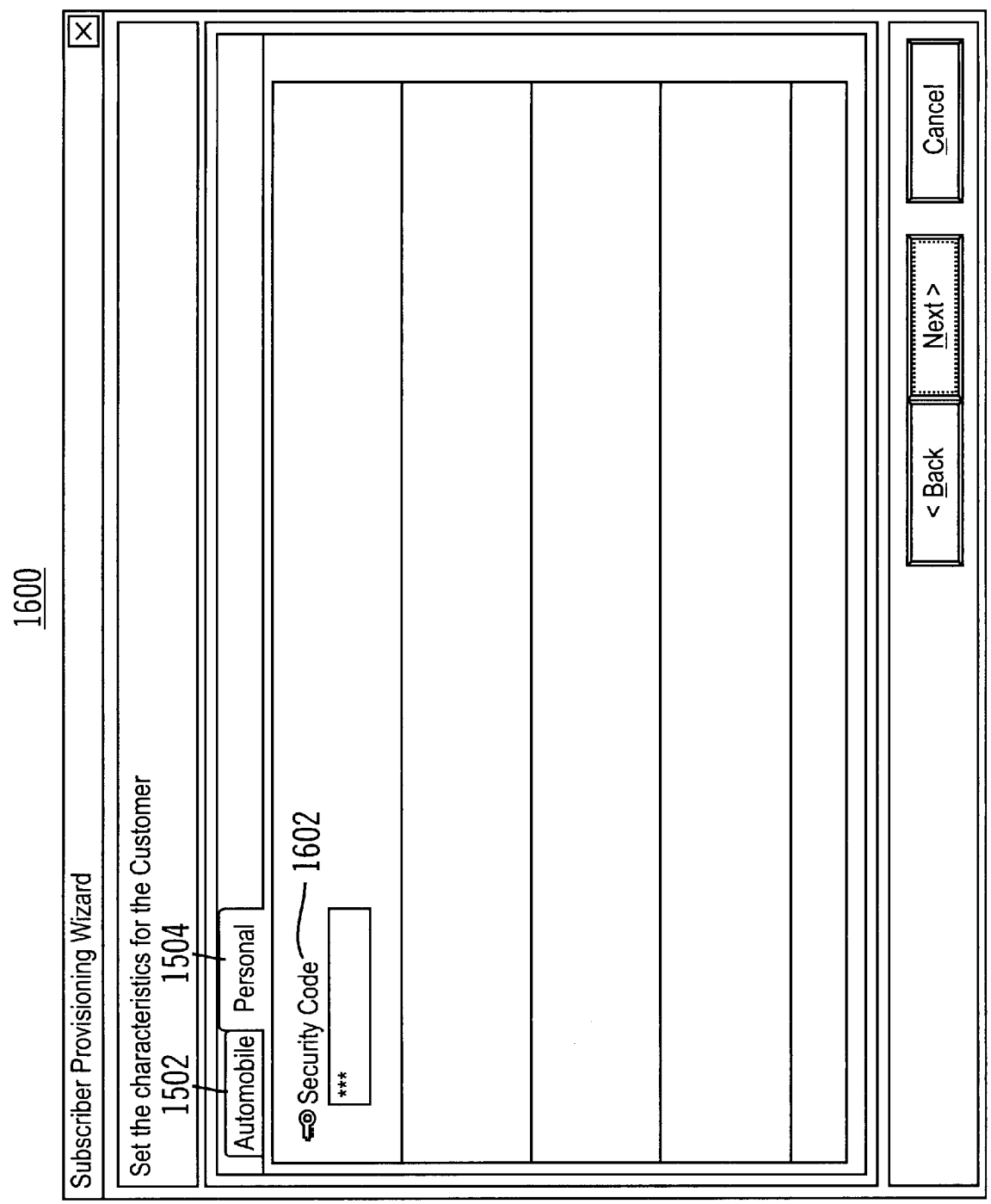
FIG. 16 is an illustration of a second exemplary graphical user interface for the runtime data entry user interface for Characteristics, according to the present invention.

FIG. 16 is an illustration 1600 of a second exemplary graphical user interface for the runtime data entry user interface for Characteristics 330, according to the present invention. As in FIG. 15, there are two Characteristic Groups 1502 for this Subscriber 1502 and Personal 1504. Shown here is the Personal Characteristic Group 1504 which has one Characteristics 1602 on it. The Characteristic whose Display 350 is "Security Code" is encrypted. The key symbol indicates that it is encrypted and characters are represented as * in the edit control.

An example would be a company that wishes to track buying behavior and demographics for a subscriber in their customer care system. A characteristic configuration interface would define characteristic groups and questions used by customer service representatives to collect subscriber information associated with an assigned market. This configuration interface would allow the administrator to set up questions, which would then appear on a subscriber-provisioning screen and allow the customer service representative to obtain information from a subscriber during this provisioning. An example of this would be if the administrator wished to track the annual income of their subscribers by market segment. They could enter the question into the system and also define a list of valid responses in a drop down list from which to choose.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for provisioning at least one subscriber characteristic in a billing system comprising the steps of:

creating at least one subscriber characteristic record;

creating at least one subscriber record with entries for subscriber identification;

inserting in at least one subscriber characteristic record, a first key for associating with at least one subscriber record;

creating at least one characteristic record with entries for subscriber characteristics;

inserting in the at least one subscriber characteristic record, a second key for associating with the at least one characteristic record so that the at least one characteristic record is associated via the second key to at least one subscriber characteristic record that has been associated via the first key with the at least one subscriber record;

creating at least one characteristic group to characteristic record;

creating at least one characteristic group record for holding characteristics for a group of subscribers;

inserting in at least one characteristic group to characteristic record, a third primary key with the at least one characteristic record; and inserting in at least one characteristic group to characteristic record, a fourth key for associating with the at least one characteristic group record so that the at least one characteristic, group record is associated via the fourth key to at least one characteristic group to characteristic record that has been associated via the third key with the at least one characteristic record.

2. The method of claim 1, wherein the step of creating a characteristic record includes creating at least one characteristics record with an entry for reading text for describing subscriber characteristics from a database in a predefined format.

3. The method of claim 1, wherein the step of creating a characteristic record includes creating at least one characteristics record with an entry for reading encrypted text for describing subscriber characteristics from a database in a predefined format.

4. The method of claim 1, further including the steps of:
creating at least one market type to characteristic group;
creating at least one marketing type record with entries for different markets of subscribers;
inserting in at least one marketing type record, a fifth key for associating with the at least one subscriber record that has been associated via the first key with the at least one subscriber characteristic record;
inserting in the at least one market to characteristic group a sixth key for associating with one characteristic group so that the at least one characteristic group is associate via the fourth key to the at least one characteristic group to characteristic record is associated via the third key with the at least one characteristic record; and
inserting in the at least one market to characteristic group a seventh key for associating with the at least one market type record so that the market type record is associated via the fifth key to the subscriber record.

5. The method of claim 1, wherein the step of creating at least one subscriber characteristic includes creating at least one subscriber characteristic on a graphical user interface where tho characteristic is a selectable field that can he manipulated using a drag and drop technique.

6. The method of claim 1, wherein the step of creating at least one subscriber characteristic includes creating at least one subscriber characteristic in a database system that has a non-modifiable database schema.

7. A method for provisioning at least one subscriber characteristic record in a relational database in a billing system comprising the steps of:
creating at least one subscriber record with entries for subscriber identification;
creating at least one characteristic record with entries for subscriber characteristics;
forming at least one subscriber characteristic record comprising the sub-steps of:
creating at least one subscriber characteristic record;
creating at a first key for associating with the at least one subscriber record;
inserting the first key in the at least one subscriber characteristic record;
creating a second key for associating with the at least one characteristic record so that the one characteristic record is associated via the second key to the at least one subscriber characteristic record that has been associated via the first key with the at least one subscriber record;
inserting the second key in the at least one subscriber characteristic record;
creating at least one characteristic group to characteristic record;
creating at least one characteristic group record for holding characteristics for a group of subscribers;
inserting in at least one characteristic group to characteristic record, a third primary key with the at least one characteristic record; and
inserting in at least one characteristic group to characteristic record, a fourth key for associating with the at least one characteristic group record so that the at least one characteristic group record is associated via the fourth key to at least one characteristic group to characteristic record that has been associated via the third key with the at least one characteristic record.

8. A computer readable medium containing program instructions for provisioning at least one subscriber characteristic in a billing system, comprising the instructions of:
creating at least one subscriber characteristic record;
creating at least one subscriber record with entries for subscriber identification;
inserting in the at least one subscriber characteristic record, a first key for associating with the at least one subscriber record;
creating at least one characteristic record with entries for subscriber characteristics;
inserting, in the at least one subscriber characteristic record, a second key for associating with the at least one characteristic record so that the at least one characteristic record is associated via the second key to the at least one subscriber characteristic record that has been associated via the first key with the at least one subscriber record;
creating at least one characteristic group to characteristic record;
creating at least one characteristic group record for holding characteristics for a group of subscribers;
inserting in the at least one characteristic group to characteristic record, a third primary key with the at least one characteristic record; and
inserting in the at least one characteristic group to characteristic record, a fourth key for associating with the at least one characteristic group record so that the at least one characteristic group record is associated via the fourth key to the at least one characteristic group to characteristic record that has been associated via the third key with the at least one characteristic record.

9. The computer readable medium of claim 8 wherein the instruction of creating a characteristic record includes creating the at least one characteristics record with an entry for reading text for describing subscriber characteristics from a database in a predefined format.

10. The computer readable medium of claim 8 wherein the instruction of claim 7, wherein the step of creating a characteristic record includes creating the at least one characteristics record with an entry for reading encrypted text for describing subscriber characteristics from a database in a predefined format.

11. The computer readable medium of claim 8, further including the instructions of:
creating at least one market type to characteristic group;
creating at least one marketing type record with entries for different markets of subscribers;
inserting in the at least one marketing type record, a fifth key for associating with the at least one subscriber record that has been associated via the first key with the at least one subscriber characteristic record;
inserting in the at least one market to characteristic group a sixth key for associating with the at least one characteristic group so that the at least one characteristic group is associate via the fourth key to the at least one characteristic group to characteristic record is associated via the third key with the at least one characteristic record; and inserting in the at least one market to characteristic group a seventh key for associating with the at least one market type record so that the market type record is associated via the fifth key to the subscriber record.

12. The computer readable medium of claim 8, wherein the instruction of creating at least one subscriber characteristic includes creating at least one subscriber characteristic includes provisioning at least one subscriber characteristic on a graphical user interface where the characteristic is a selectable field that can be manipulated using a drag and drop technique.

13. The computer readable medium of claim 8, wherein the instruction of creating at least one subscriber characteristic includes creating at least one subscriber characteristic in a database system that has a non-modifiable database schema.

14. A billing system for provisioning at least one subscriber characteristic comprising:

at least one subscriber characteristic record;

at least one subscriber record with entries for subscriber identification;

a first key for associating with at least one subscriber record;

means for inserting the first key in the at least one subscriber characteristic record;

at least one characteristic record with entries for subscriber characteristics;

a second key for associating with the at least one characteristic record so that the at least one characteristic record is associated via the second key to the at least one subscriber characteristic record that has been associated via the first key with the at least one subscriber record;

means for inserting the second key in the at least one subscriber characteristic record;

at least one characteristic group to characteristic record;

at least one characteristic group record for holding characteristics for a group of subscribers;

means for inserting in the at boat one characteristic group to characteristic record, a third primary key with one characteristic record;

a fourth key for associating with one characteristic group record so that the one characteristic group record is associated via the fourth key to the at least one characteristic group to characteristic record that has been associated via the third key with the one characteristic record; and means for inserting the forth key in the at least one characteristic group to characteristic record.

15. The billing system of claim 14, wherein the characteristic record includes an entry for reading text for describing subscriber characteristics from a database in a predefined format.

16. The billing system of claim 14, wherein the characteristic record includes an entry for reading encrypted text for describing subscriber characteristics from a database in a predefined format.

17. The billing system of claim 14, further comprising:

at least one market type to characteristic group;

at least one marketing type record with entries for different markets of subscribers;

a fifth key for associating with the at least one subscriber record that has been associated via the first key with the at least one subscriber characteristic record;

means for inserting the fifth key in the at least one marketing type record;

a sixth key for associating with one characteristic group so that the one characteristic group is associate via the fourth key to at least one characteristic group to characteristic record is associated via the third key with the one characteristic record;

means for inserting the sixth key in at least one market to characteristic group;

a seventh key for associating with at least one market type record so that the market type record is associated via the fifth key to the subscriber record; and means for inserting the seventh key in at least one market to characteristic group.

18. The billing system of claim 14, wherein the at least one subscriber characteristic includes at least one subscriber characteristic on a graphical user interface where the characteristic is a selectable field that can be manipulated using a drag and drop technique.

19. The billing system of claim 14, wherein the at least one subscriber characteristic includes at least one subscriber characteristic in a database system that has non-modifiable database schema.

* * * * *